United States Patent

Sato et al.

[11] Patent Number: 5,478,292
[45] Date of Patent: Dec. 26, 1995

[54] EPICYCLOIDAL GEAR TYPE SPEED CHANGE GEAR SYSTEM

[75] Inventors: Masayuki Sato; Takashi Kuse, both of Komatsu, Japan

[73] Assignee: Kabushiki Kaisha Komatsu Seisakusho, Tokyo, Japan

[21] Appl. No.: 199,241

[22] PCT Filed: Aug. 21, 1992

[86] PCT No.: PCT/JP92/01058

§ 371 Date: Feb. 28, 1994

§ 102(e) Date: Feb. 28, 1994

[87] PCT Pub. No.: WO93/04306

PCT Pub. Date: Mar. 4, 1993

[30] Foreign Application Priority Data

Aug. 27, 1991 [JP] Japan ..................... 3-240413

[51] Int. Cl.⁶ .................... B60K 41/26; B60K 17/08; F16H 57/10
[52] U.S. Cl. ................ 475/293; 475/123; 475/159; 475/900
[58] Field of Search ..................... 475/900, 293, 475/122, 123, 159, 286

[56] References Cited

U.S. PATENT DOCUMENTS

| | | | |
|---|---|---|---|
| 3,815,445 | 6/1974 | Gorrell et al. | 475/286 |
| 4,020,932 | 5/1977 | Windish | 475/900 X |
| 4,192,409 | 3/1980 | Ueda | 475/900 X |

FOREIGN PATENT DOCUMENTS

| | | | |
|---|---|---|---|
| 1213689 | 3/1966 | Germany | 475/286 |
| 50-59477 | 6/1975 | Japan . | |
| 60-98228 | 6/1985 | Japan . | |
| 61-149655 | 7/1986 | Japan | 475/286 |
| 58-116849 | 6/1988 | Japan . | |
| 226349 | 1/1990 | Japan | 475/286 |

*Primary Examiner*—Rodney H. Bonck
*Assistant Examiner*—Nathan O. Jensen
*Attorney, Agent, or Firm*—Richards, Medlock & Andrews

[57] ABSTRACT

In a speed change gear system (1) in accordance with the present invention for changing between forward movement and rearward movement of a vehicle and for changing a speed of the vehicle by selectively fixing sun gears, carriers and ring gears of a plurality of epicyclic gear devices with respective mating clutches (8, 14, 24, 28), a brake (29) is connected to an output shaft (21) of this speed change gear system (1) to share energy absorption of the respective clutches, and the hydraulic pressure for the brake (29) is controlled in accordance with a rotation rate of the output shaft (21). Therefore, these clutches (8,14,18,24,28) can be small-sized. When the brake (29) is released, a quantity of lubrication oil being supplied is reduced, and therefore the stirring resistance of the lubrication oil can be reduced, and the transmission efficiency can be satisfactory.

18 Claims, 4 Drawing Sheets

FIG. I

EPICYCLOIDAL GEAR TYPE SPEED CHANGE GEAR SYSTEM

FIELD OF THE INVENTION

The present invention relates to a speed change gear system for changing between forward and rearward movement and for changing a speed of a vehicle by selectively fixing sun gears, carriers and ring gears of a plurality of epicycloidal gear devices with respective clutches, and, more particularly, to an epicycloidal type speed change gear system with an output shaft coupled to a brake to absorb a rotational energy which is generated in changing between forward and rearward movement of a vehicle.

DESCRIPTION OF RELATED ART

A prior art system, as represented by the schematic diagram of a epicycloidal gear type speed change gear system 51 in FIG. 4, provides a driving source 52 such as an engine or a torque converter, an input shaft 53 which is driven by the drive source 52, and an R sun gear 54 and an F sun gear 55 which are coupled to the input shaft 53. In addition, the epicycloidal gear type speed change gear system has an R planetary gear 57 which is carried by the R carrier 56 and is engaged with the R sun gear 54, an R clutch 58 for fixing the R carrier 56 to a case 59 or releasing the R carrier 56 from the case 59, an R ring gear 60 which engages with the R planetary gear 57, and a carrier 61 coupled to the ring rear 60. Furthermore, the epicycloidal gear type speed change gear system has an F planetary gear 62 which is carried by the carrier 61 and engaged with the F sun gear 55, an F ring gear 63 which is engaged with the F planetary gear 62, and an F clutch 64 for fixing the F ring gear 63 to the case 59 or releasing the F ring gear 63 from the case 59.

The above speed change gear system is provided with a third planetary gear 67 which is carried by the carrier 61 and is engaged with a third sun gear 65 and a third ring gear 66, a third clutch 68 which fixes or releases the third ring gear 66 to or from the case 59, and an output shaft 71 which connects the third sun gear 65, the second sun gear 69 and the first sun gear 70. In addition, a second planetary gear 73 which is carried by the carrier 61 and is engaged with the second sun gear 69 and the second ring gear 72, a second clutch 74 which fixes or releases the second ring gear 72 to or from the case 59, and a carrier 75 which is coupled with the second ring gear 72 are provided. Furthermore, a first planetary gear 77 is carried by the carrier 75 and is engaged with the first sun gear 70 and the first ring gear 76, and a first clutch 78 fixes or releases the first ring gear 76 to or from the case 59. The numeral 79 denotes an inertial member of a vehicle.

In case of changing over movement of a vehicle from the second forward gear operation to the second rearward gear operation in the above described arrangement of the system, the F clutch 64 and the second clutch 74 are released immediately upon the start of a speed changing operation. The second clutch 74 is then reengaged in advance of the engagement of the R clutch 58. Under this condition, the output shaft 71 is rotating due to inertial member 79 of the vehicle, and therefore the R carrier 56 is also rotating. As the hydraulic pressure of the R clutch 58 is gradually increased, the rotation of the R carrier 56 is gradually slowed down and finally stopped, and the input shaft rotation and the output shaft rotation coincide with the speed changing ratio for the second gear. At this time, the R clutch 58 absorbs a large energy in order to reversely rotate the inertial member 79 of the vehicle.

The following describes the changeover of rearward to forward movement, for example, from the first rearward gear operation to the second forward gear operation.

For the first rearward gear operation, the R clutch 58 is engaged; the first clutch 78 is engaged; the R carrier gear 56 and the first ring gear 76 are fixed to the case 59; and other clutches are kept released. To make the change, the R clutch 58 and the first clutch 78 are released, and then the second clutch 74 is engaged. In this case, the energy to be absorbed by the second clutch 74 approximates the inertia, which is a small value, of the speed change gear system 51. Then the F clutch 64 is engaged. At this time, the F clutch 64 absorbs a large energy to reversely rotate the inertial member 79 of the vehicle.

There is a problem in that the areas of the F clutch 64 and the R clutch 58 which absorb such large energy should be increased, and therefore the speed change gear system needs to have a large size. In addition, the clutches which are not engaged perform idle rotation during operation and stir the lubrication oil, and the resulting stirring resistance causes a horsepower loss to deteriorate transmission efficiency.

SUMMARY OF THE INVENTION

The present invention is made in view of the above problems of the related art, and is intended to share energy absorption of the clutches with the output shaft of a speed change gear system coupled to a brake in a speed change gear system for changing between forward movement and rearward movement of a vehicle and for changing a speed of the vehicle by selectively fixing the sun gears, carriers and ring gears of a plurality of epicycloidal gear devices with respective mating clutches.

The speed change gear system in accordance with the present invention is provided with a rotary wheel coupled to the output shaft, a rotation sensor for measuring a rotation speed of the rotary wheel, a controller which receives a signal from the rotation sensor and a signal from a speed change lever of the speed change gear system, and a hydraulic pressure control valve for supplying and stopping a hydraulic oil flow to respective clutches according to a control signal from the controller, thereby controlling the oil pressure of the brake in accordance with the rotation rate of the output shaft.

In addition, the speed change gear system is provided with piping for supplying a lubrication oil to the brake, a pilot changeover valve installed in this piping, and piping for guiding a pilot pressure of the hydraulic pressure control valve to this pilot changeover valve to reduce the quantity of lubrication oil when releasing the brake.

Since the brake absorbs the energy when forward movement is to be changed over to rearward movement, the areas of the respective clutches can be reduced so as to be compact in dimensions. When the brake clutch is released, the quantity of lubrication oil to be supplied to the clutches is reduced in order to lessen the stirring resistance of the lubrication oil, thus improving the transmission efficiency.

BEST MODE FOR CARRYING OUT THE INVENTION

Figure 1:
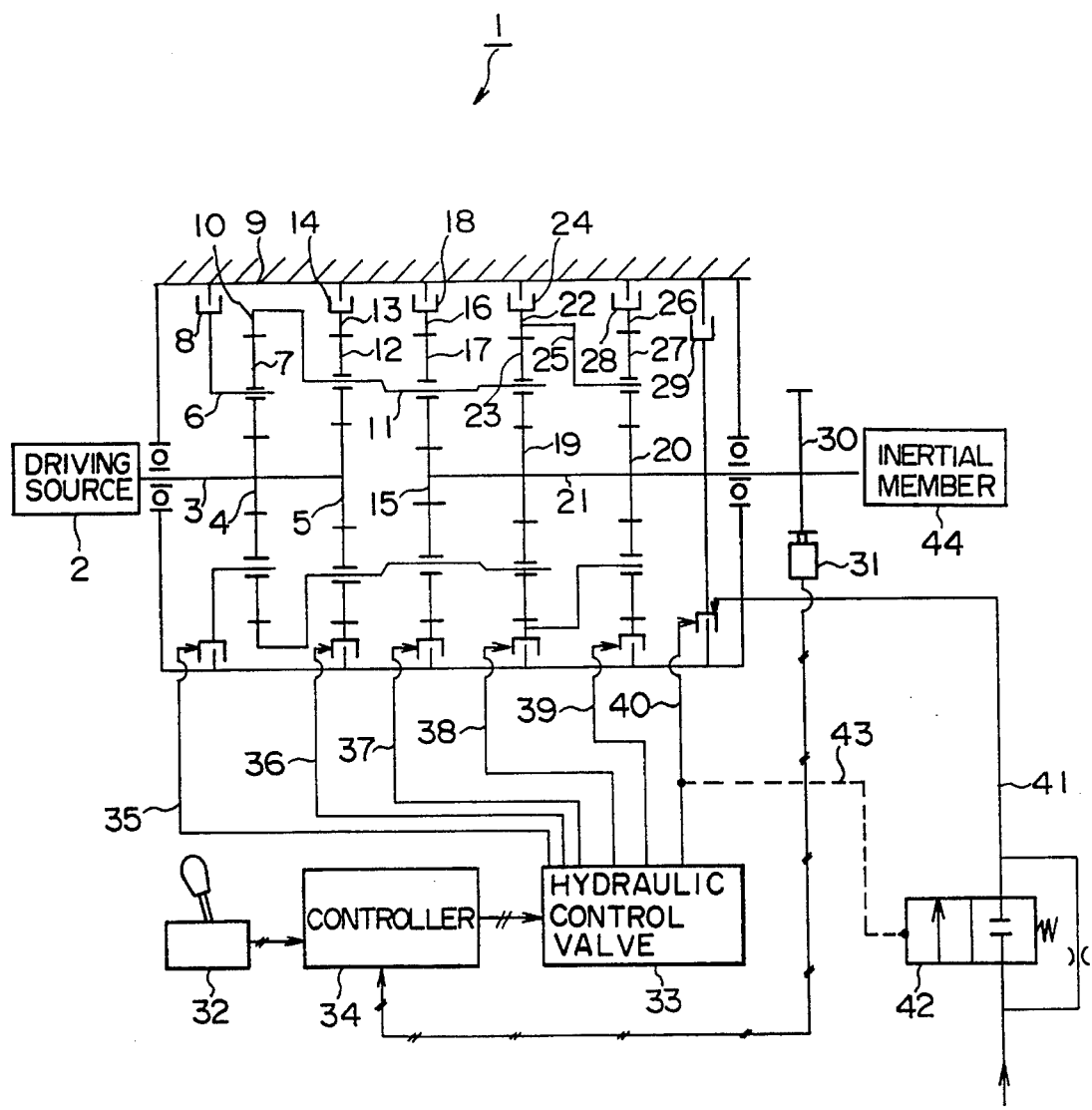
FIG. 1 is a schematic illustration of an epicycloidal gear type speed change gear system in accordance with the present invention.

Referring to FIG. 1 schematically illustrating the present invention, an epicycloidal gear type speed change gear system 1 is provided with an input shaft 3 which is driven by a driving source 2 such as an engine or a torque converter and an R sun gear 4 and an F sun gear 5 which are connected to the input shaft 3. This epicycloidal gear type speed change gear system 1 is provided with an R planetary gear 7 which is carried by an R carrier 6 and is engaged with an R sun gear 4, an R clutch 8 which fixes or releases the carrier 6 to or from a case 9, an R ring gear 10 which is engaged with the R planetary gear 7 and a carrier 11 which is coupled to the R ring gear 10. It also has an F planetary gear 12 which is carried by the carrier 11 and is engaged with the F sun gear 5, an F ring gear 13 which is engaged with the F planetary gear 12, and an F clutch 14 which fixes or releases the F ring gear 13 to or from the case 9. It is also provided with a third planetary gear 17 which is carried by the carrier 11 and is engaged with the third sun gear 15 and the third ring gear 16, a third clutch 18 which fixes or releases the third ring gear 16 to or from the case 9, and an output shaft 21 which connects the third sun gear 15, the second sun gear 19 and the first sun gear 20. It is further provided with a second planetary gear 23 which is carried by the carrier 11 and engaged with the second sun gear 19 and the second ring gear 22, a second clutch 24 which fixes or releases the second ring gear 22 to or from the case 9, and a carrier 25 which is coupled to the second ring gear 22. It has a first planetary gear 27 which is carried by the carrier 25 and is engaged with the first sun gear 20 and the first ring gear 26, and a first clutch 28 which fixes or releases the first ring gear 26 to or from the case 9.

A brake 29 and a rotary wheel 30 are connected to the output shaft 21. A rotation sensor 31 for measuring the rotation rate of the rotary wheel 30, a controller 34 which receives signals from the rotation sensor 31 and a speed change lever 32 and controls a hydraulic pressure control valve 33, and piping 35, 36, 37, 38, 39 and 40 for supplying a hydraulic oil to the hydraulic cylinders of the respective clutches 8, 14, 18, 24, and 28 and brake 29 through the hydraulic pressure control valve 33. The system is also provided with piping 41 for supplying a lubrication oil to the brake 29, a pilot changeover valve 42 provided in the piping 41, and piping 43 for guiding a pilot pressure from piping 40 to the pilot changeover valve 42. The numeral 44 denotes an inertial member of the vehicle.

The clutches which engage at respective speed steps carry a correlation as shown with circles in Table 1. In other words, the F clutch 14 and the first clutch 28 are engaged for first forward gear operation, the F clutch 14 and the second clutch 24 are engaged for second forward gear operation, and the F clutch 14 and the third clutch 18 are engaged for third forward gear operation. The R clutch 8 and the first clutch 28 are engaged for first rearward gear operation, the R clutch 8 and the second clutch 24 are engaged for second rearward gear operation, and the R clutch 8 and the third clutch 18 are engaged for third rearward gear operation.

TABLE 1

| Speed Step | Clutch engaged | | | | |
| --- | --- | --- | --- | --- | --- |
|  | F clutch | R clutch | 1st clutch | 2nd clutch | 3rd clutch |
| FWD shift 1 | 0 |  | 0 |  |  |
| FWD shift 2 | 0 |  |  | 0 |  |
| FWD shift 3 | 0 |  |  |  | 0 |
| RWD shift 1 |  | 0 | 0 |  |  |
| RWD shift 2 |  | 0 |  | 0 |  |
| RWD shift 3 |  | 0 |  |  | 0 |

Figure 2:
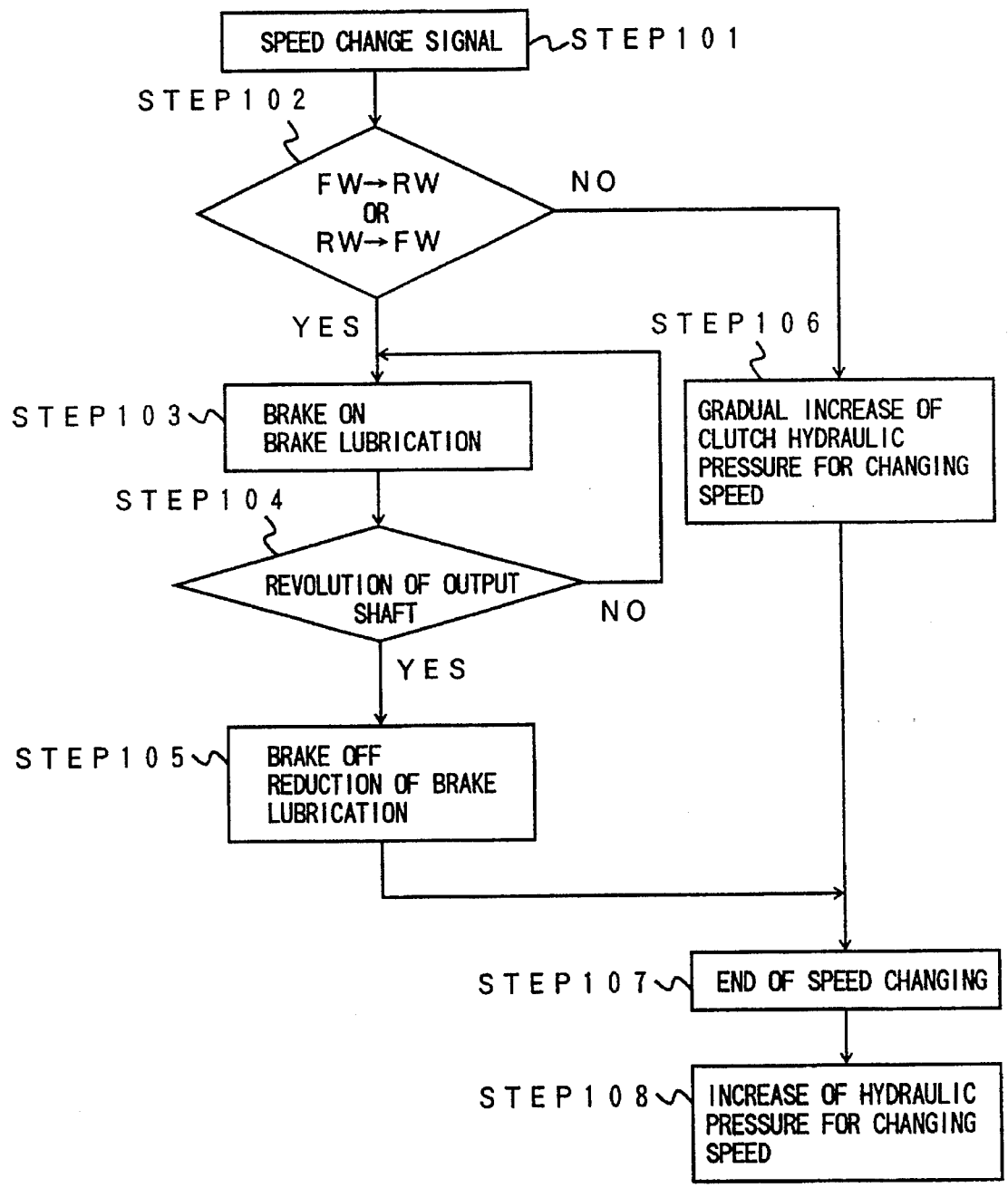
FIG. 2 is a flow chart illustrating the operation of this speed change gear system.

The operation of the speed change gear system is described below, referring to the flow chart shown in FIG. 2. In step 101, a speed change signal is generated from the speed change lever 32 to the controller 34. Changeover from forward movement to rearward movement or from rearward movement to forward movement is determined in step 102 and, if YES is given, the hydraulic pressure control valve 33 operates to release the one of the F clutch 14 and the R clutch 8 which is currently engaged, and the operation advances to step 103. In step 103, the hydraulic pressure control valve 33 operates and supplies a hydraulic oil to the piping 40 to actuate the brake 29. At this time, the hydraulic oil is also supplied to the piping 43, and the pilot changeover valve 42 is changed over so that the lubrication oil is supplied to the brake 29. Simultaneously, the R clutch 8 or the F clutch 14 is engaged. In step 104, it is determined from a signal of the rotation sensor 31 for measuring the rotary wheel 30 whether or not the rotation rate of the output shaft 21 is smaller than a specified value e approximate to 0 (zero). If NO is given, the operation returns to a step before step 103 and, if YES is given, the operation advances to step 105. In step 105, the hydraulic pressure control valve 33 operates to stop the flow of a hydraulic oil to the piping 40 and thereby releases the brake 29. When the supply of the hydraulic oil to the piping 40 is stopped, the pressure of the pilot piping 43 is canceled and the pilot changeover valve 42 is changed over, thus reducing the quantity of lubrication oil to be supplied to the brake 29. If NO is given in step 102, the operation advances to step 106, the hydraulic pressure control valve 33 operates with a signal from the controller 34 to release a speed clutch currently engaged, that is, one of the first clutch 28, second clutch 24 and third clutch 18, the hydraulic pressure for the speed clutch to be engaged is gradually increased to cause that clutch to be engaged, and the operation advances to step 107. In step 107, speed change is finished and the hydraulic pressure of the speed clutch being engaged is further boosted up to a specified pressure (step 108).

Figure 3:
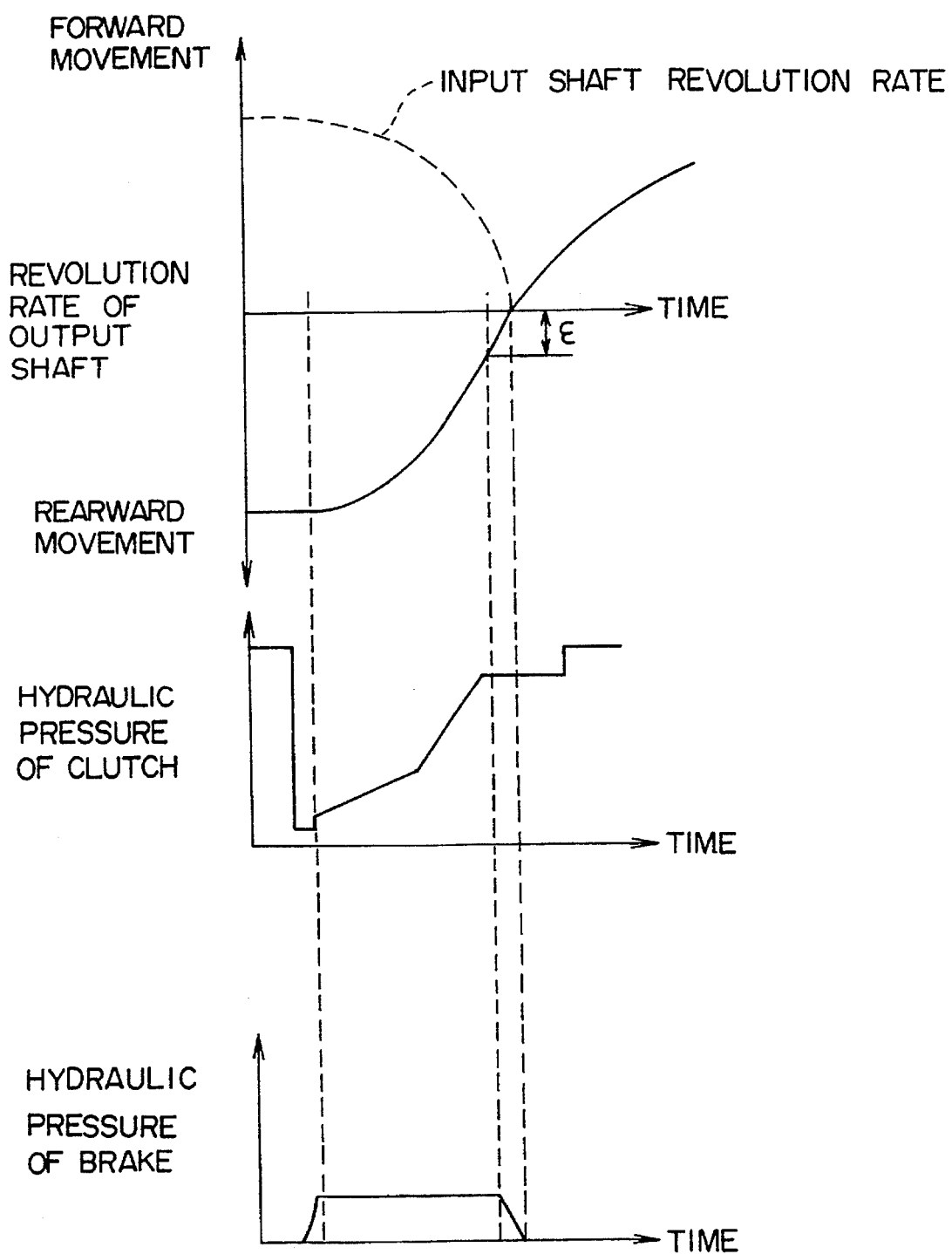
FIG. 3 is a diagram illustrating the correlation of the output shaft rotation rate, the hydraulic pressure for the clutches and the hydraulic pressure for the brake.
Figure 4:
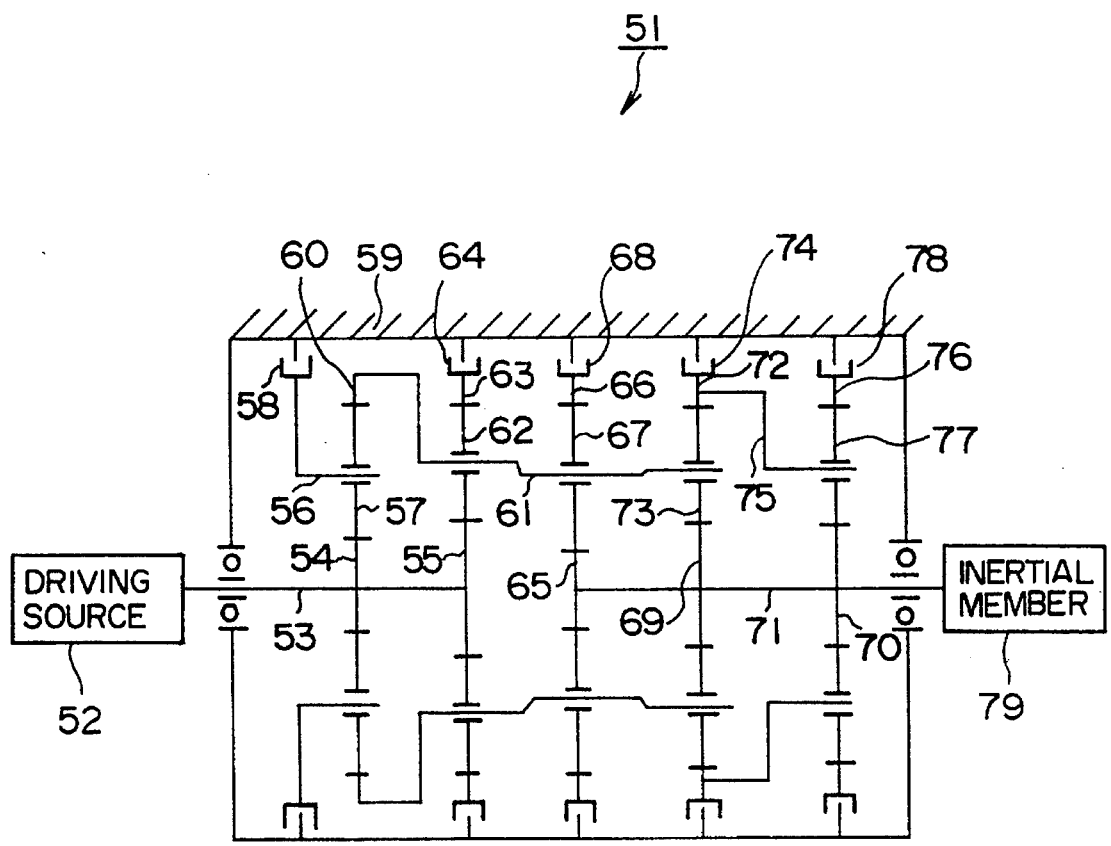
FIG. 4 is a schematic diagram of a prior art epicycloidal gear type speed change gear system.

FIG. 3 shows the correlation of the rotation rate of the output shaft 21, the hydraulic pressure for those clutches such as the F clutch 14, R clutch 8, first clutch 28, second clutch 24 and third clutch 18, and the hydraulic pressure for the brake 29. When the hydraulic pressure for the clutches is reduced according to a speed change signal from the speed change lever 32, the hydraulic pressure for the brake increases. When the hydraulic pressure for the brake 29 reaches a specified value, the hydraulic pressure for the clutches gradually increases. When the rotation rate of the output shaft 21 approaches 0, the hydraulic pressure for the brake begins to reduce. When the rotation rate of the input shaft 3 and the rotation rate of the output shaft 21 coincide with the speed change ratio, the hydraulic pressure for the brake is 0. The hydraulic pressure for the clutches rises up to the predetermined value.

With the addition of the brake 29 to the epicycloidal gear type speed change gear system 1, the F clutch 14 and the R clutch 8 can be small in size since the clutch energy is absorbed by the brake 29 and one of the F clutch 14 and the R clutch 8. In addition, the F clutch 14, the R clutch 8, and the speed control clutches such as the first, second and third clutches which share the energy can be small-sized. When the brake 29 is released, the stirring resistance of hydraulic oil can be small to reduce the quantity of lubrication oil to be supplied, and the transmission efficiency can thus be increased.

INDUSTRIAL APPLICABILITY

The speed change gear system in accordance with the present invention is useful as an epicycloidal gear type speed change gear system which employs small-sized clutches and provides less stirring resistance of lubrication oil and higher transmission efficiency.

That which is claimed is:

1. An epicycloidal gear speed change system for changing between forward movement and rearward movement of a vehicle and for changing a speed of movement of the vehicle, said system comprising an input shaft, an output shaft, and a plurality of epicyclic gear devices for selectively providing a connection between the input shaft and the output shaft; each of the epicyclic gear devices having a sun gear, a planetary gear, and a ring gear; each of the epicyclic gear devices having a respective mating clutch associated therewith; whereby a changeover between forward movement and rearward movement is accomplished by selectively actuating the mating clutches; a brake connected to the output shaft to selectively absorb a portion of the rotational energy of the output shaft; and a control system for controlling the brake in accordance with a rotation rate of the output shaft so that the brake is actuated from the start of a changeover between forward movement and rearward movement until the rotation of the output shaft becomes smaller than a specified value; wherein the control system comprises a rotation sensor positioned to measure a rotation rate of the output shaft and to provide a rotation signal responsive thereto, a speed change lever for providing a speed signal, and a controller for receiving the rotation signal from the rotation sensor and the speed signal from the speed change lever and for providing a control signal for controlling the brake in accordance with the rotation rate of the output shaft.

2. An epicycloidal gear speed change system in accordance with claim 1, wherein the control system further comprises means for selectively supplying pressurized hydraulic fluid to the mating clutches, and for reducing the pressure of the hydraulic fluid being supplied to the mating clutches while the brake is actuated.

3. An epicycloidal gear speed change system in accordance with claim 2, wherein the means for selectively supplying pressurized hydraulic fluid to the mating clutches increases the pressure of the hydraulic fluid being supplied to the mating clutches upon the brake being released.

4. An epicycloidal gear speed change system in accordance with claim 3, further comprising means for selectively supplying lubricating oil to the brake when the brake is actuated and for reducing the quantity of lubricating oil to the brake when the brake is released.

5. An epicycloidal gear speed change system in accordance with claim 1, wherein the plurality of epicyclic gear devices comprises a forward epicyclic gear device connected to the input shaft, a rearward epicyclic gear device connected to the input shaft, a first speed epicyclic gear device connected to the output shaft, and a second speed epicyclic gear device connected to the output shaft.

6. An epicycloidal gear speed change system in accordance with claim 5, further comprising a third speed epicyclic gear device connected to the output shaft.

7. An epicycloidal gear speed change system in accordance with claim 5, further comprising a case, wherein each of the sun gear of the forward epicyclic gear device and the sun gear of the rearward epicyclic gear device is connected to the input shaft, wherein a first carrier is connected to the planetary gear of the rearward epicyclic gear device, and wherein the mating clutch associated with the rearward epicyclic gear device selectively connects the first carrier to the case and selectively releases the first carrier from the case.

8. An epicycloidal gear speed change system in accordance with claim 7, wherein the brake selectively connects the output shaft to the case and selectively releases the output shaft from the case.

9. An epicycloidal gear speed change system in accordance with claim 7, wherein each of the sun gear of the first speed epicyclic gear device and the sun gear of the second speed epicyclic gear device is connected to the output shaft; and wherein a second carrier is connected to each of the planetary gear of the forward epicyclic gear device, the planetary gear of the second speed epicyclic gear device, and the ring gear of the rearward epicyclic gear device.

10. An epicycloidal gear speed change system in accordance with claim 9, wherein the mating clutch associated with the forward epicyclic gear device selectively connects the ring gear of the forward epicyclic gear device to the case and selectively releases the ring gear of the forward epicyclic gear device from the case; wherein the mating clutch associated with the first speed epicyclic gear device selectively connects the ring gear of the first speed epicyclic gear device to the case and selectively releases the ring gear of the first speed epicyclic gear device from the case; wherein the mating clutch associated with the second speed epicyclic gear device selectively connects the ring gear of the second speed epicyclic gear device to the case and selectively releases the ring gear of the second speed epicyclic gear device from the case; and further comprising a third carrier connecting the planetary gear of the first speed epicyclic gear device to the ring gear of the second speed epicyclic gear device.

11. An epicycloidal gear speed change system in accordance with claim 10, further comprising a third speed epicyclic gear device having a sun gear connected to the output shaft, a planetary gear connected to the second carrier, and a ring gear, wherein the mating clutch associated with the third speed epicyclic gear device selectively connects the ring gear of the third speed epicyclic gear device to the case and selectively releases the ring gear of the third speed epicyclic gear device from the case.

12. An epicycloidal gear speed change system in accordance with claim 11, wherein the brake selectively connects the output shaft to the case and selectively releases the output shaft from the case.

13. An epicycloidal gear speed change system for changing between forward movement and rearward movement of a vehicle and for changing a speed of movement of the vehicle, said system comprising an input shaft, an output shaft, and a plurality of epicyclic gear devices for selectively providing a connection between the input shaft and the output shaft; each of the epicyclic gear devices having a sun gear, a planetary gear, and a ring gear; each of the epicyclic gear devices having a respective mating clutch associated therewith; whereby a changeover between forward movement and rearward movement is accomplished by selectively actuating the mating clutches; a brake connected to the output shaft to selectively absorb a portion of the rotational energy of the output shaft; and a control systems for controlling the brake in accordance with a rotation rate of the output shaft so that the brake is actuated from the start of a changeover between forward movement and rearward movement until the rotation of the output shaft becomes smaller than a specified value; wherein the control system comprises means for selectively supplying pressurized hydraulic fluid to the mating clutches, and for reducing the pressure of the hydraulic fluid being supplied to the mating clutches while the brake is actuated.

14. An epicycloidal gear speed change system in accordance with claim 13, wherein the means for selectively supplying pressurized hydraulic fluid to the mating clutches increases the pressure of the hydraulic fluid being supplied to the mating clutches when the brake is released.

15. An epicycloidal gear speed change system for changing between forward movement and rearward movement of a vehicle and for changing a speed of movement of the vehicle, said system comprising an input shaft, an output shaft, and a plurality of epicyclic gear devices for selectively providing a connection between the input shaft and the output shaft; each of the epicyclic gear devices having a sun gear, a planetary gear, and a ring gear; each of the epicyclic gear devices having a respective mating clutch associated therewith; whereby a changeover between forward movement and rearward movement is accomplished by selectively actuating the mating clutches; a brake connected to the output shaft to selectively absorb a portion of the rotational energy of the output shaft; a control system for controlling the brake in accordance with a rotation rate of the output shaft so that the brake is actuated from the start of a changeover between forward movement and rearward movement until the rotation of the output shaft becomes smaller than a specified value; and means for selectively supplying lubricating oil to the brake when the brake is actuated and for reducing the quantity of lubricating oil being supplied to the brake when the brake is released.

16. An epicycloidal gear speed change system for changing between forward movement and rearward movement of a vehicle and for changing a speed of movement of the vehicle, said system comprising an input shaft, an output shaft, and a plurality of epicyclic gear devices for selectively providing a connection between the input shaft and the output shaft; each of the epicyclic gear devices having a sun gear, a planetary gear, and a ring gear; each of the epicyclic gear devices having a respective mating clutch associated therewith; whereby a changeover between forward movement and rearward movement is accomplished by selectively actuating the mating clutches; a brake connected to the output shaft to selectively absorb a portion of the rotational energy of the output shaft; a control system for controlling the brake in accordance with a rotation rate of the output shaft so that the brake is actuated from the start of a changeover between forward movement and rearward movement until the rotation of the output shaft becomes smaller than a specified value; first piping for supplying an oil to the brake; a pilot changeover valve installed in the first piping; and second piping for providing to the pilot changeover valve a pilot hydraulic pressure related to a control signal for controlling the brake so the quantity of oil being supplied to the brake through the first piping is reduced when the brake is released.

17. An epicycloidal gear speed change system for changing between forward movement and rearward movement of a vehicle and for changing a speed of movement of the vehicle, said system comprising an input shaft, an output shaft, and a plurality of epicyclic gear devices for selectively providing a connection between the input shaft and the output shaft; each of the epicyclic gear devices having a sun gear, a planetary gear, and a ring gear; each of the epicyclic gear devices having a respective mating clutch associated therewith; whereby a changeover between forward movement and rearward movement is accomplished by selectively actuating the mating clutches; a brake connected to the output shaft to selectively absorb a portion of the rotational energy of the output shaft; and a control system for controlling the brake in accordance with a rotation rate of the output shaft so that the brake is actuated from the start of a changeover between forward movement and rearward movement until the rotation of the output shaft becomes smaller than a specified value; wherein the control system comprises a rotary wheel coupled to the output shaft, a rotation sensor positioned to measure a rotation rate of the rotary wheel and to provide a rotation signal responsive thereto, a speed change lever for providing a speed signal, a hydraulic pressure control valve for supplying and stopping a flow of hydraulic oil to respective ones of the mating clutches and to the brake, and a controller for receiving the rotation signal from the rotation sensor and the speed signal from the speed change lever and for providing a control signal to the hydraulic pressure control valve so that a hydraulic pressure of hydraulic oil to the brake is controlled in accordance with the rotation rate of the output shaft.

18. An epicycloidal gear speed change system in accordance with claim 17, further comprising first piping for supplying an oil to the brake, a pilot changeover valve installed in the first piping, second piping for providing to the pilot changeover valve a pilot hydraulic pressure from the hydraulic control valve so that the quantity of oil being supplied to the brake through the first piping is reduced when the brake is released.

* * * * *